(12) United States Patent
Sivacoe (10) Patent No.: US 10,895,341 B2
(45) Date of Patent: *Jan. 19, 2021

(54) PIPE PIG

(71) Applicant: Orlande Wayne Sivacoe, Red Deer (CA)

(72) Inventor: Orlande Wayne Sivacoe, Red Deer (CA)

(*) Notice: Subject to any disclaimer, the term of this patent is extended or adjusted under 35 U.S.C. 154(b) by 193 days.

This patent is subject to a terminal disclaimer.

(21) Appl. No.: 16/107,602

(22) Filed: Aug. 21, 2018

(65) Prior Publication Data

US 2019/0120418 A1 Apr. 25, 2019

Related U.S. Application Data

(63) Continuation of application No. 14/315,210, filed on Jun. 25, 2014, now Pat. No. 10,060,569.

(51) Int. Cl.
| | |
|---|---|
| *B08B 9/051* | (2006.01) |
| *F16L 55/28* | (2006.01) |
| *F16L 55/32* | (2006.01) |
| *B08B 9/049* | (2006.01) |
| *F16L 55/26* | (2006.01) |
| *F16L 55/44* | (2006.01) |
| *E03F 7/12* | (2006.01) |

(52) U.S. Cl.
CPC ............. *F16L 55/32* (2013.01); *B08B 9/049* (2013.01); *B08B 9/051* (2013.01); *E03F 7/12* (2013.01); *F16L 55/265* (2013.01); *F16L 55/28* (2013.01); *F16L 55/44* (2013.01)

(58) Field of Classification Search
CPC ............. B08B 9/051; F16L 55/28; B61B 13/10
See application file for complete search history.

(56) References Cited

U.S. PATENT DOCUMENTS

| | | | |
|---|---|---|---|
| 3,044,749 A | | 7/1962 | Dilday |
| 4,170,902 A | | 10/1979 | Pallan |
| 4,526,106 A | | 7/1985 | Okada et al. |
| 4,628,613 A | | 12/1986 | Laymon et al. |
| 4,852,391 A | | 8/1989 | Ruch et al. |
| 4,862,808 A | * | 9/1989 | Hedgcoxe ............... B25J 5/007 |
| | | | 104/138.2 |

(Continued)

FOREIGN PATENT DOCUMENTS

| | | |
|---|---|---|
| CA | 2530932 A1 | 6/2007 |
| JP | 2012076475 A | 4/2012 |

(Continued)

OTHER PUBLICATIONS

International Search Report and Written Opinion dated Sep. 18, 2015, issued in corresponding International Application No. PCT/CA2015/050597, filed Jun. 25, 2015, 10 pages.

(Continued)

*Primary Examiner* — Randall E Chin
(74) *Attorney, Agent, or Firm* — Christensen O'Connor Johnson Kindness, PLLC (57) ABSTRACT

A pipe pig is provided with linked wheels, and at least a central wheel of the linked wheels is pivotally linked to adjacent wheels through a spring loaded connection that biases the central wheel out of straight line alignment with the adjacent wheels. The pipe pig may be used to negotiate tight bends in a pipe and carry sensing electronics.

20 Claims, 9 Drawing Sheets

(56) References Cited

U.S. PATENT DOCUMENTS

| | | | |
|---|---|---|---|
| 5,172,639 | A | 12/1992 | Wiesman et al. |
| 5,423,230 | A | 6/1995 | Olander et al. |
| 5,565,633 | A | 10/1996 | Wernicke |
| 5,797,993 | A | 8/1998 | Woehleke |
| 6,035,786 | A | 3/2000 | McKay et al. |
| 6,381,797 | B1 | 5/2002 | Filippovitch et al. |
| 7,000,548 | B2 | 2/2006 | Sabatie |
| 9,383,055 | B2 | 7/2016 | Hirose et al. |
| 2012/0291209 | A1 | 11/2012 | Warren et al. |
| 2015/0107485 | A1 | 4/2015 | Hirose et al. |
| 2016/0123517 | A1 | 5/2016 | Hirose et al. |

FOREIGN PATENT DOCUMENTS

| | | | |
|---|---|---|---|
| WO | 2015012087 | A1 | 1/2015 |
| WO | 2012042921 | A1 | 4/2020 |

OTHER PUBLICATIONS

"Articulated Pigs," Pigs Unlimited International, Inc., Tomball, Tex., [retrieved Dec. 19, 2013], 1-page brochure.

"DOE-Funded Pipeline Robot Revolutionizes Inspection Process: Explorer II Demonstrates Huge Potential for Hard-to-Reach Gas Line Inspections," News Release, Dec. 4, 2007, U.S. Department of Energy, [retrieved Dec. 19, 2013], 2 pages.

Svoboda, E., "Pigging the Unpiggable: Robots Keep Gas Lines From Blowing Up," Popular Science 278(2):32, Feb. 2011, 4 pages.

Isomura, K., "Development of Mobile Robot ThesV With Multiple Spherical Wheels," Bachelor's thesis figures (with figure descriptions in English), Tokyo Institute of Technology Faculty of Engineering, Feb. 2011, 67 pages.

Isomura, K, "Development of Articulated Spherical Wheeled In-Pipe Robot 'ThesV,'" Proceedings of the JSME Conference on Robotics and Mechatronics, Okayama, Japan, May 26-28, 2011, 4 pages.

\* cited by examiner

PIPE PIG

BACKGROUND

Pipe pigs are known that are self-propelled and that are smart, in that they carry and may be controlled by electronics. However, some pipes have tight bends, for example in headers in heat exchangers, and this makes it difficult for some smart pigs to get around the bends. Conventional pigs are configured to fit centrally within pipes, either occupying the entire cross section of a pipe, or with symmetrical legs contacting the interior surface of the pipe. Although wheeled pigs are known, the symmetrical arrangement limits the wheels to a small size relative to the internal diameter of the pipe.

SUMMARY

A new pipe pig is disclosed. The pipe pig is provided with linked segments, each segment having a size in cross section smaller than an internal dimension of a pipe which the pipe pig is configured to enter; the pig having a biasing element for biasing the linked segments away from a straight line alignment, so that adjacent segments are biased into contact with opposite sides of the pipe.

In an embodiment, an intermediate segment and another segment are linked by a connector that pivots about a first axis associated with the intermediate segment. In a further embodiment, a further segment is also connected to the intermediate segment by a connector that pivots about the first axis. The connectors may comprise further pivotal elements that pivot about axes perpendicular to the first axis. The intermediate pig segment may comprise an intermediate wheel rotatable around the first axis, the intermediate wheel configured to contact a first portion of an internal surface of the pipe when in use. The segments connected to the intermediate segment may comprise respectively first and second flanking wheels rotatable around respective axes parallel to the first axis and configured to contact a portion of the internal surface of the pipe opposite to the first portion when in use. At least one of the intermediate wheel, first flanking wheel and second flanking wheel may be a hub driven wheel. The second flanking wheel may be connected to tow a battery pack. A video camera may be mounted on the first flanking wheel and the video camera may have a field of view directed away from the intermediate wheel.

A new pipe pig is disclosed. In an embodiment, the pipe pig is provided with linked wheels, and at least a central wheel of the linked wheels is pivotally linked to adjacent wheels through a spring loaded connection that biases the central wheel out of straight line alignment with the adjacent wheels. The pipe pig may be used to negotiate tight bends in a pipe and carry sensing electronics.

In an embodiment of a pipe pig, the pipe pig includes a body formed of connected wheels, the connected wheels including at least an intermediate wheel and a first flanking wheel and a second flanking wheel, each of the connected wheels having an axis about which the wheel rotates, and the axes of each of the connected wheels being parallel to each other, the first flanking wheel being connected to the intermediate wheel by a first hinged link and the second flanking wheel being connected to the intermediate wheel by a second hinged link and the first hinged link and the second hinged link being connected by a tensioner that biases the connected wheels away from a straight line alignment of the axes of the connected wheels.

BRIEF DESCRIPTION OF THE FIGURES

There will now be described embodiments of a pipe pig with reference to the figures by way of example, in which like reference characters denote like elements, and in which.

DETAILED DESCRIPTION

Figure 1:
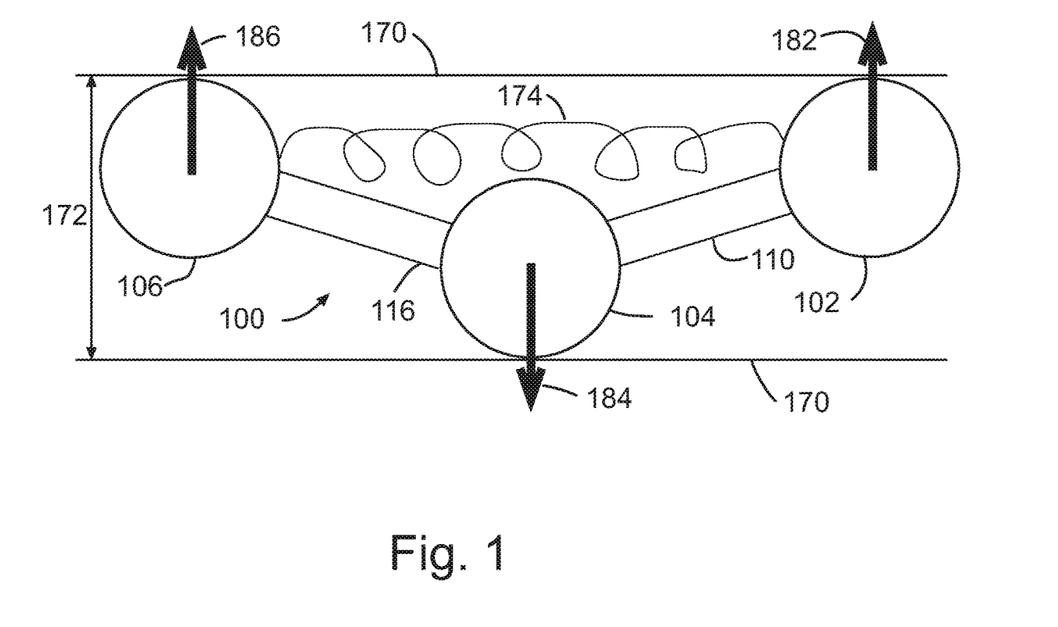
FIG. 1 is a schematic diagram of an articulated pig with linked segments biased away from a straight line alignment, in a pipe.

Referring to FIG. 1, a pipe pig 100 is formed of connected segments 102, 104 and 106. The diagram is schematic and although each segment is depicted as circular and all the same size, for the purposes of this diagram the segments can be taken to have any shape and can have different sizes. The pig 100 is depicted within a pipe 170 having an internal dimension, here a diameter (ID) 172. The segments are smaller in cross section than the internal diameter of the pipe so that each of the segments, if taken separately from the rest of the pig, could be positioned within the pipe without touching the internal surface of the pipe. For non-round pipes, the segments need only be smaller than an internal dimension of the pipes. The segments are connected by connectors 110 and 116. The segments are biased using biasing element 174 which biases the segments away from a straight-line alignment thus biasing adjacent segments into contact with opposite sides of the pipe. Arrows 182, 184 and 186 indicate the general direction of bias. The biasing element here is depicted schematically as a spring connecting segments 102 and 106, but is not limited to what is depicted. Further examples of biasing elements will be given later.

Figure 2:
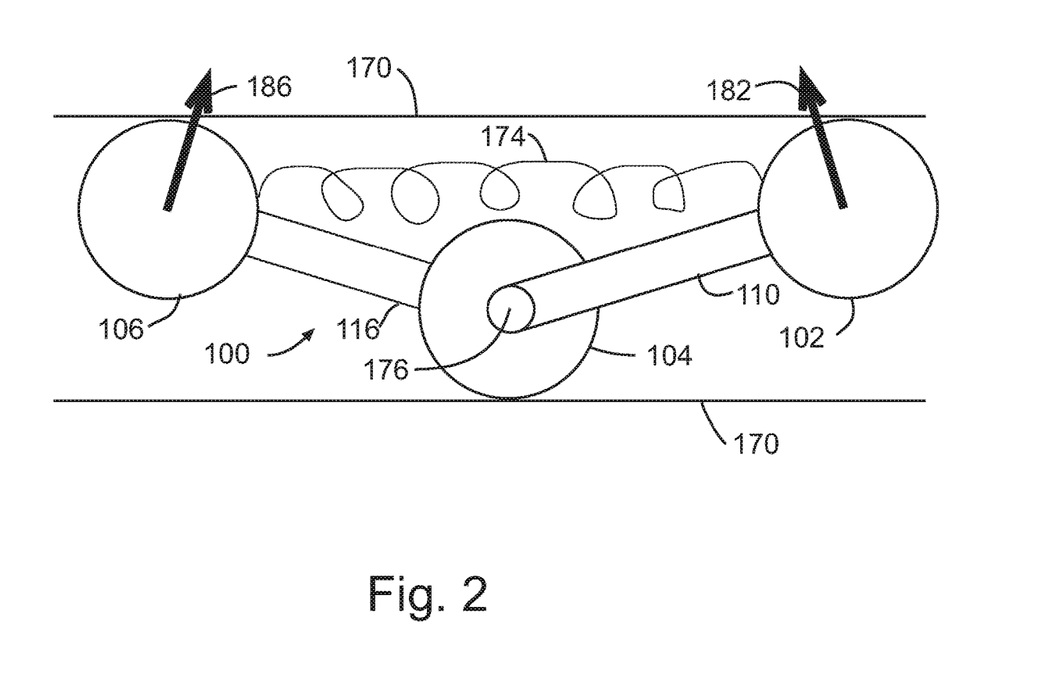
FIG. 2 is a schematic diagram of an embodiment of the articulated pig of FIG. 1 in which a connector connecting a segment on one side of an intermediate segment connects to the intermediate segment at an axial pivotal connection.

Referring to FIG. 2, an embodiment of the pipe pig of FIG. 1 is shown in which the connector 110 pivots about an axis 176 associated with segment 104. In this figure, arrows 182 and 186 show the general directions the biasing element biases segments 102 and 106 relative to segment 104 if elements of the pig other than the pivot and the biasing element are relatively rigid.

Figure 3:
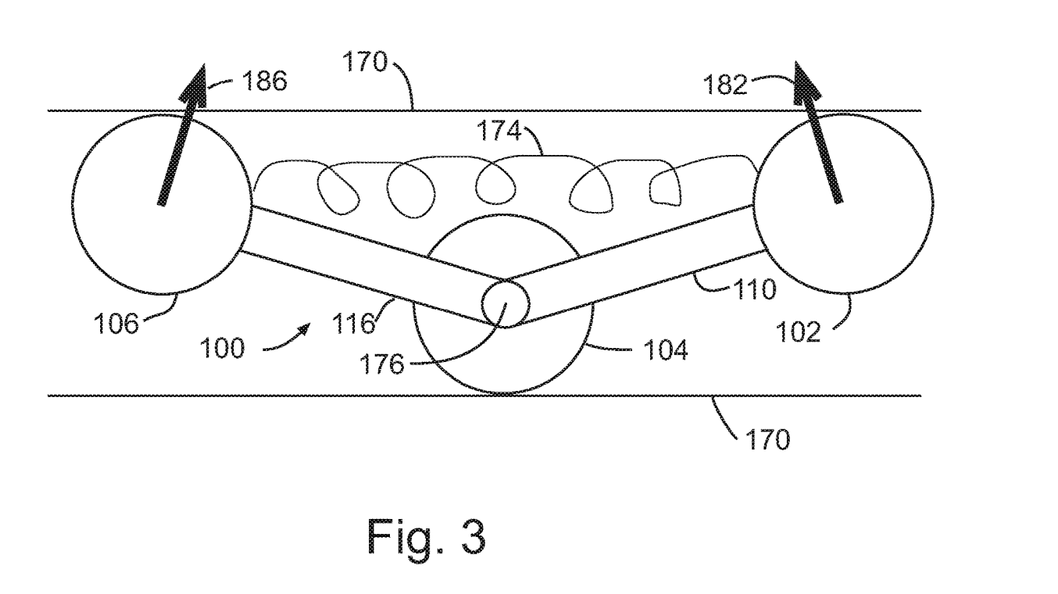
FIG. 3 is a schematic diagram of an embodiment of the articulated pig of FIG. 2 in which connectors connecting a segment on both sides of an intermediate segment connect to the intermediate segment at an axial pivotal connection.

Referring to FIG. 3, an embodiment of the pipe pig of FIG. 2 is shown in which connector 116 also pivots about axis 176.

Figure 4:
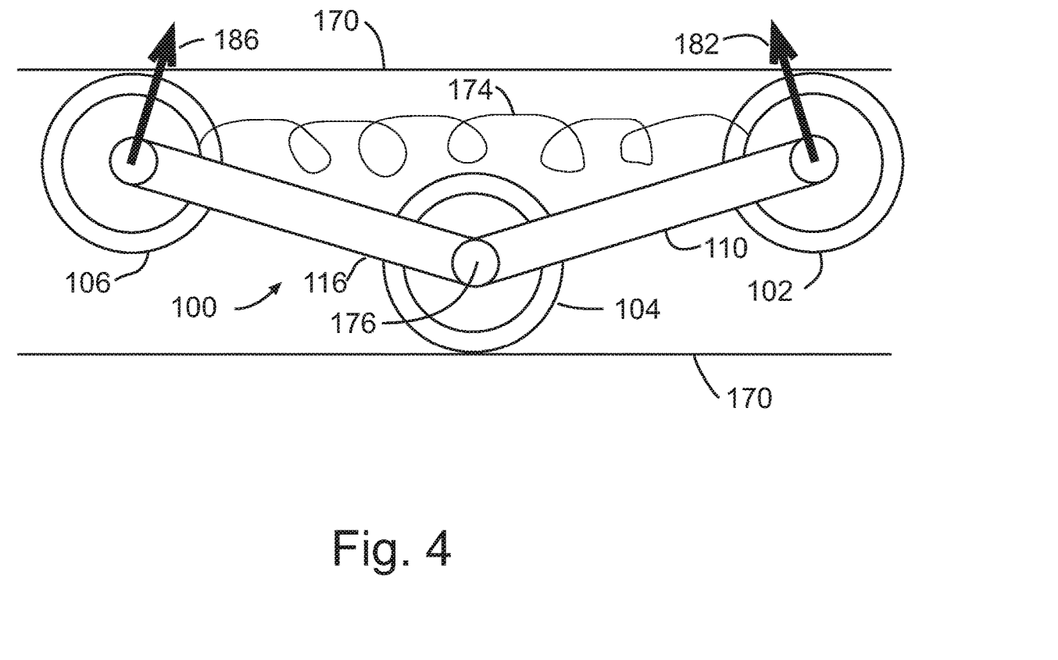
FIG. 4 is a schematic diagram of embodiment of the articulated pig of FIG. 3 in which the segments comprise large wheels.

Referring to FIG. 4, an embodiment of the pipe pig of FIG. 2 is shown in which the pig segments comprise wheels. The wheels as depicted are sufficiently large that each wheel substantially comprises the outer diameter of the respective pig segment as viewed from a direction aligned with an axis of the wheel, but smaller wheels could be used. In the embodiment depicted the connectors between segments are pivotally connected to the segments at the same axes the wheels rotate around. In another embodiment, the connectors could be pivotally connected but not at the same axes as the wheel. In another embodiment, the connectors could be not pivotally connected.

Figure 5:
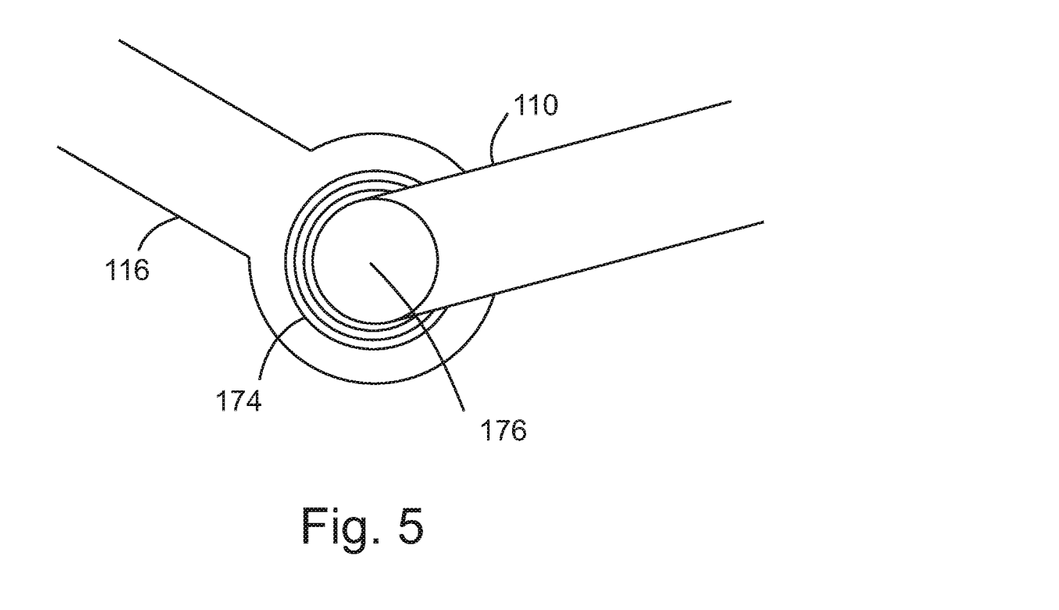
FIG. 5 is a drawing of a torsion spring as an example biasing element, drawn schematically as a spiral.

Referring to FIG. 5, an example biasing element 174 is shown comprising a torsion spring disposed at a pivot 176 between two arms 110 and 116. The torsion spring may be adjustable for example by providing a disk (not shown) attached to one of the arms at the pivot, the attitude of the disk being adjustable, and connecting the torsion spring between the disk and the other arm. Other examples of biasing elements include: A spring connecting points on the two arms; a leaf spring connecting the pivot and points on the arms to push on the pivot relative to the arms; a piston between the arms, which may contain a gas or a fluid pressurized by a gas or a spring; a cable between points on the arms, the cable tightened for example by a coil spring attached to a reel; or active biasing elements which may include for example, in an embodiment where a motor drives a wheel relative to one of the arms, a brake to brake the other arm relative to the wheel.

Figure 6:
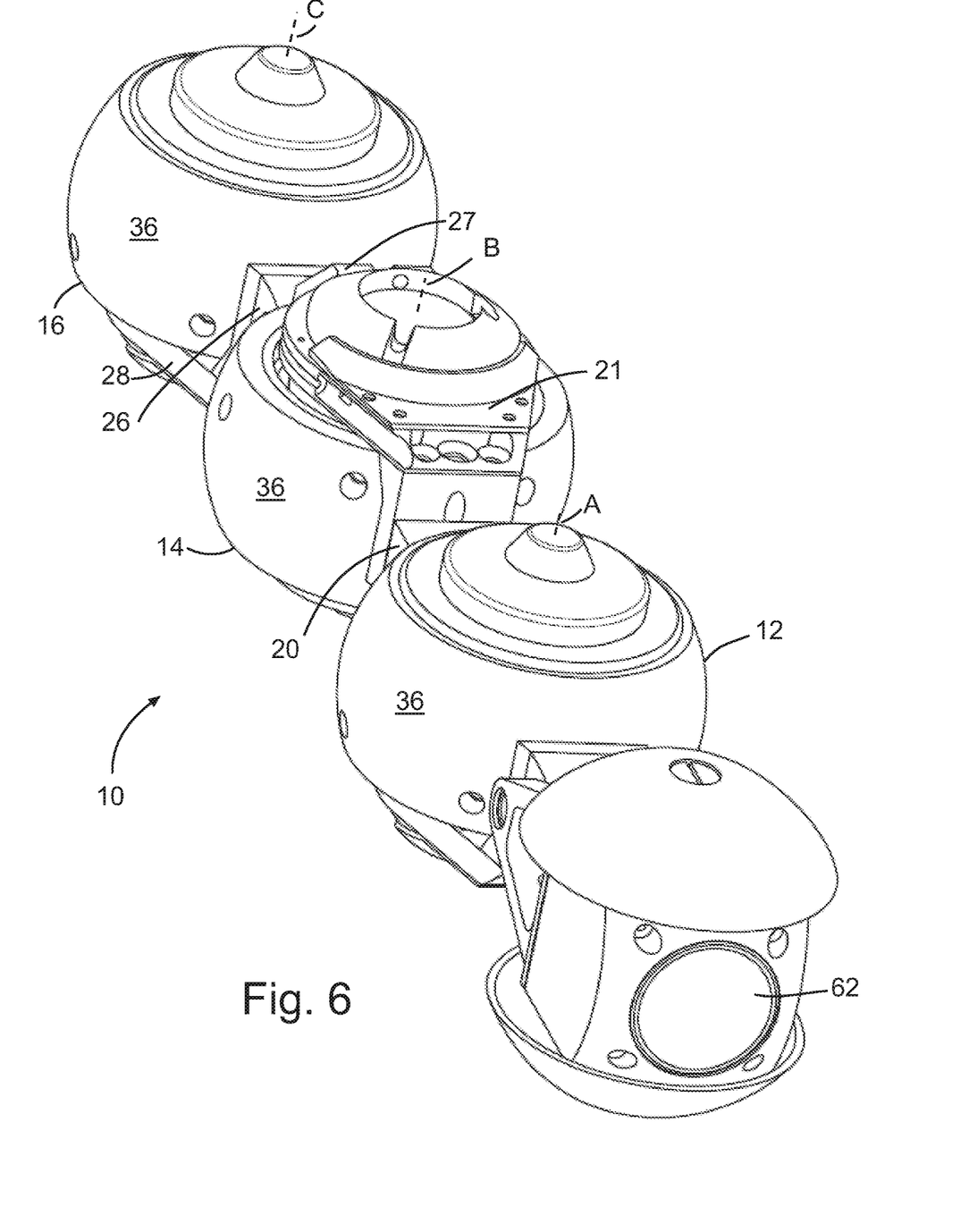
FIG. 6 is a perspective view of an embodiment of an articulated smart pig.
Figure 7:
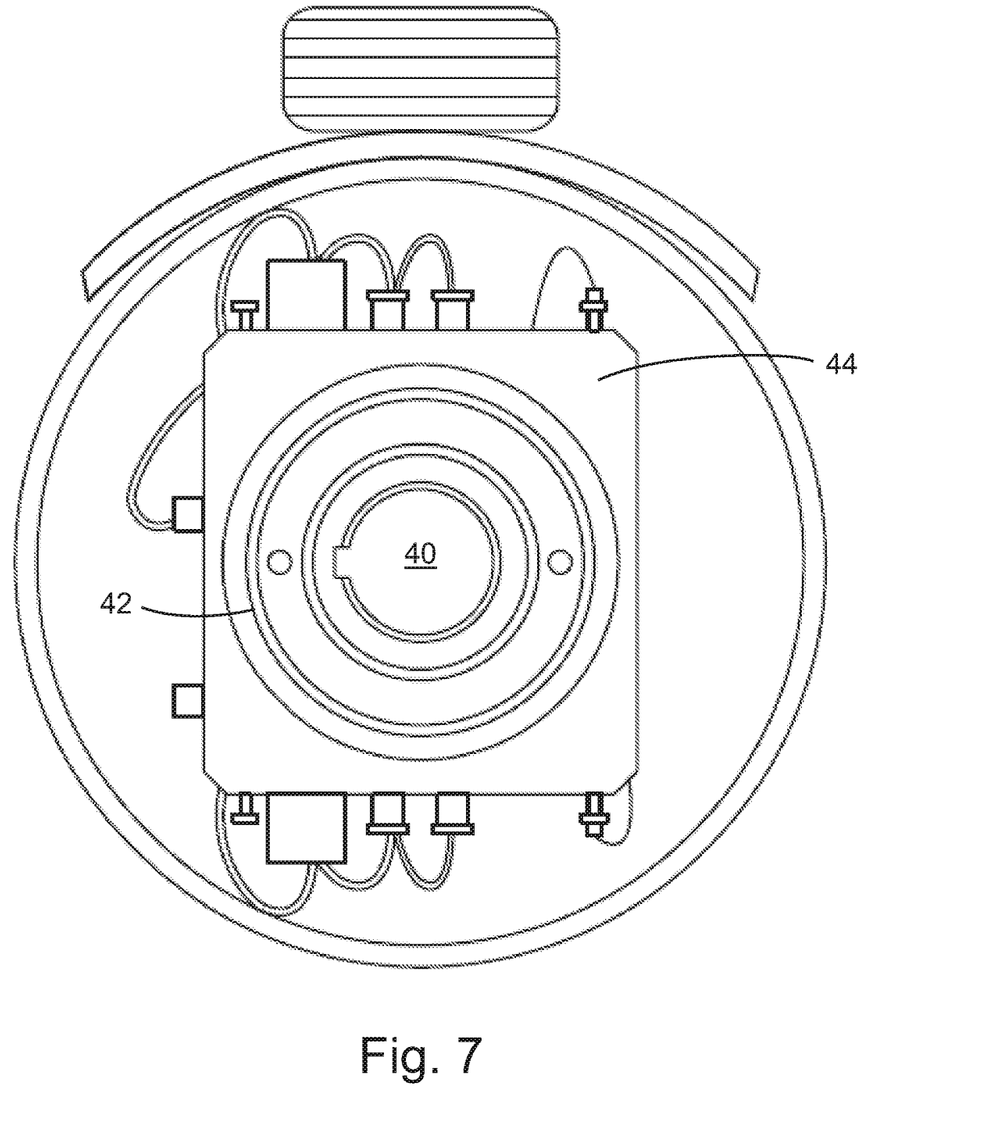
FIG. 7 is a side view of a single wheel showing an axle configuration of an articulated smart pig.
Figure 8:
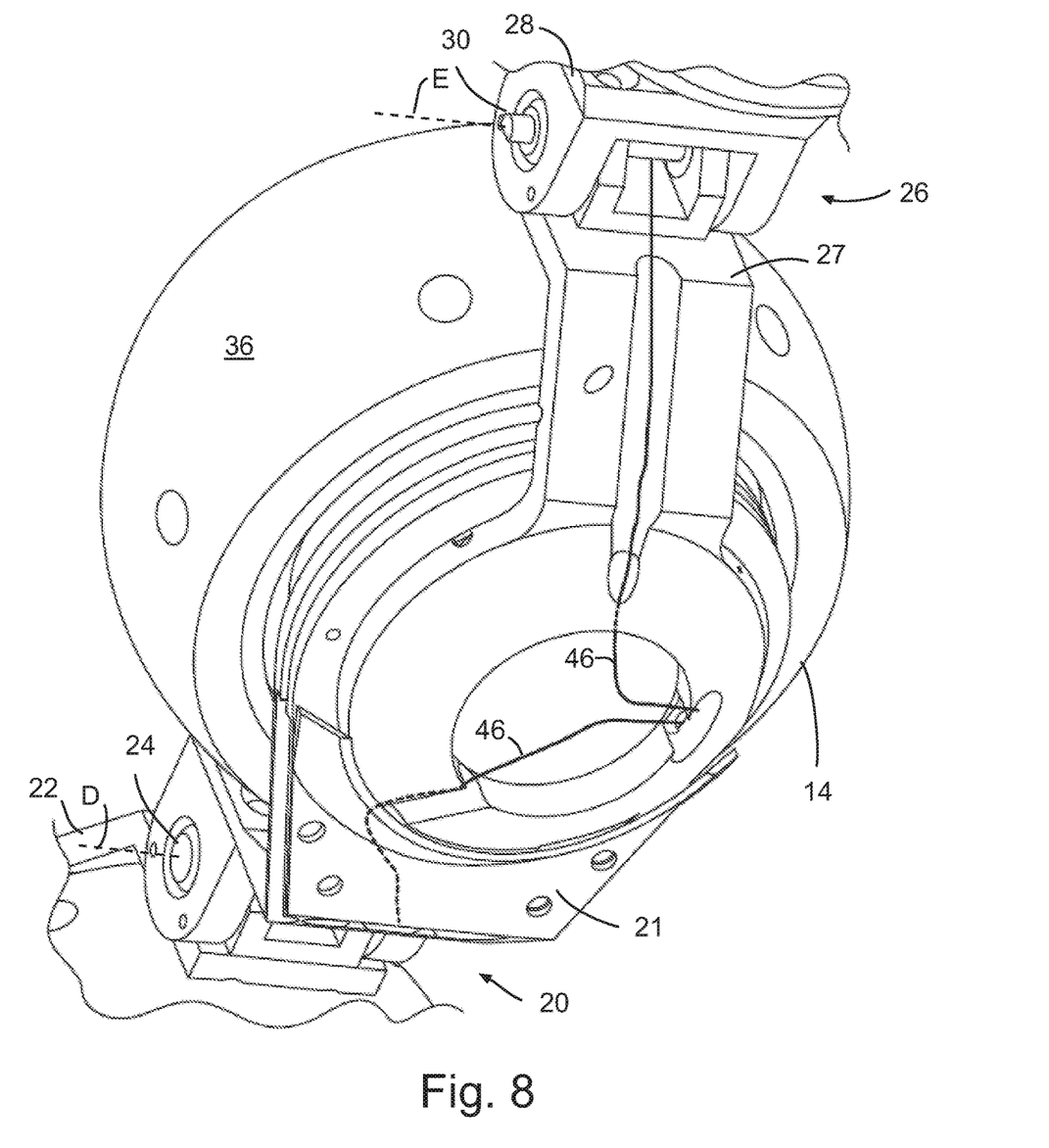
FIG. 8 is a perspective view of a wheel and connecting link arrangement for the articulated smart pig of FIG. 6.

Referring to FIGS. 6-8, a pipe pig 10 is formed of connected wheels 12, 14 and 16. The connected wheels include at least an intermediate wheel 14 and a first flanking wheel 12 and a second flanking wheel 16. Although a three wheeled pipe pig is shown, any number of wheels could be connected together providing there are three or more and each wheel may house a separate set of electronics. Each of the connected wheels 12, 14, 16 has an axis (respectively A, B, C) about which the wheel rotates.

The axes A and B preferably lie in the same plane, and when the wheels are aligned in respect of the alignment of joint 24 the axes A and B are parallel to each other. The axes B and C preferably lie in the same plane, and when the wheels are aligned in respect of the alignment of joint 30 the axes B and C are parallel to each other. The term parallel used here means substantially parallel and likewise for being in the same plane (coplanar). Some degree of axial misalignment is permitted without the pipe pig losing its functionality. In addition, in a group of more than three wheels, only three wheels are required to provide a force against the pipe wall to provide traction. In a group of six wheels, the wheels may be grouped into two groups of three, both of which groups may have independent traction and other functionality. When there are two groups of three in series, the groups may be connected by a swivel joint that allows the two groups of wheels to rotate relative to each other about the axis of a pipe in which they are operating.

Wheel 12 is connected to wheel 14 by a hinged link 20 formed of connecting arms 21 and 22 that are hinged together by a joint 24 having an axis D that is perpendicular to the axes A and B and that lies on a line connecting the centers of the wheels 12 and 14. Wheel 16 is connected to wheel 14 by a hinged link 26 formed of connecting arms 27 and 28 that are hinged together by a joint 30 having an axis E that is perpendicular to the axes C and B and that lies on a line connecting the centers of the wheels 16 and 14. The hinged link 20 and the hinged link 26 are connected by a tensioner (biasing element, not shown) that biases the connected wheels 12, 14 and 16 away from a straight line alignment of the axes of the connected wheels. The tensioner thus forces the wheels 12, 14 and 16 into a V-shape. If there are five wheels in the pipe pig 10, each intermediate wheel being biased out of straight line arrangement by a tensioner, then the wheels form a W shape.

The wheels 12, 14 and 16, or others if present, may have any suitable diameter but preferably have a diameter more than half the inside diameter (ID) of a pipe 170 that the pipe pig is going to be used in and less than the ID of the pipe. The wheels 12, 14 and 16 may each have a smooth rounded traction surface 36 since that has been found to assist in frictional engagement of the wheel with the inner surface of a pipe. The traction surfaces 36 may have a radius of curvature in a plane that includes the wheel axis that is close to but less than the radius of curvature of the pipe the pipe pig is intended to be used in. In a preferred embodiment the wheels may be about 3 inches in diameter with a curved outer surface for more surface area in contact with a pipe interior wall, for use in a pipe of 4 inch internal diameter. It is preferred that the wheels have as much traction as possible with the interior of the pipe. Smooth rounded traction surface 36 may be made of a soft material to enhance traction. Preferably, for larger diameter pipes larger diameter power wheels are used, as larger wheels have more contact surface area allowing more traction to pull larger units.

The hinged links 20 and 26 rotate relative to each other about the axis B of the intermediate wheel 14. One of the hinged links 20 and 26, here hinged link 26, may lie on top of the other hinged link. An arrangement may also be provided with the hinged links 20 and 26 on opposite sides of the intermediate wheel 14, but this makes it harder to run wires between the wheels and it is better to have the hinged links connect to the intermediate wheel on the same side of the wheel. The hinged links may also be provided on both sides of each wheel. In such an embodiment, where there are hinged links on each side of the wheels, the hinged links on one side need not meet between the wheels.

The outer or upper hinged link, link 26 in FIG. 6 and FIG. 8, may connect to a central shaft or axle 40 shown in FIG. 7. The inner hinged link 20 may be connected, for example by a friction fit supplemented with suitable connectors, to an outer shaft 42. The central shaft 40 may be journalled within the outer shaft 42. The hinged links 20, 26 may thus rotate relative to each other about the axis B. The outer shaft 42 may be journalled within an electromagnet 44. By including a suitable magnet in the outer shaft 42, for example a permanent magnet, energizing the electromagnet 44 may cause the wheel 14 to rotate about the shafts 40, 42, and the wheel 14 will thus function as a hub driven wheel or wheel with a hub motor. Electrical energy may be supplied to the electromagnet 44 through a cable 46 that runs along the hinged links 20, 26.

Figure 9:
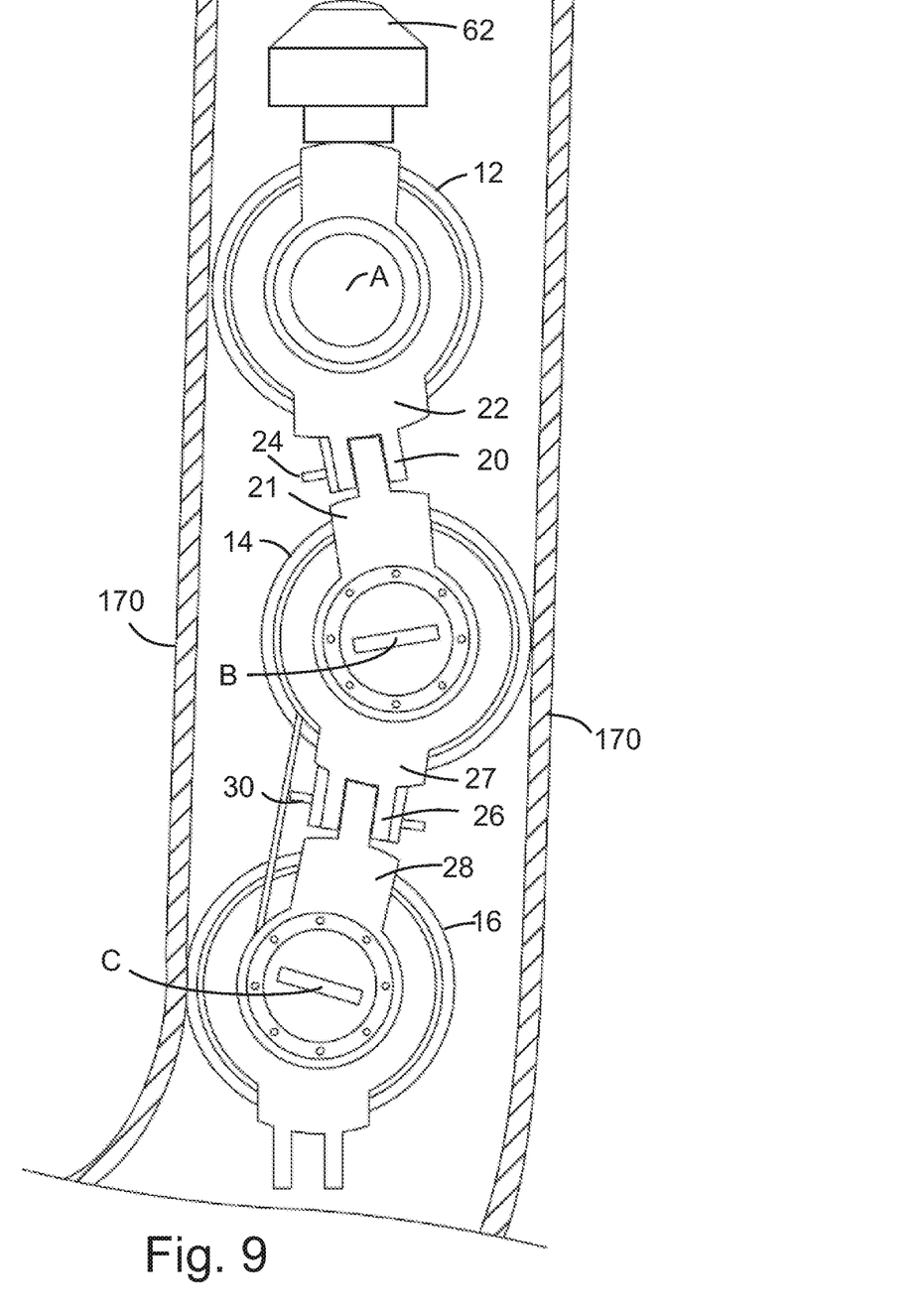
FIG. 9 is a side view of an embodiment of an articulated smart pig in operation in a pipe.

FIG. 9 shows an embodiment in which the hinged links connect on the same side of all wheels. This embodiment is shown in a pipe 170.

Figure 10:
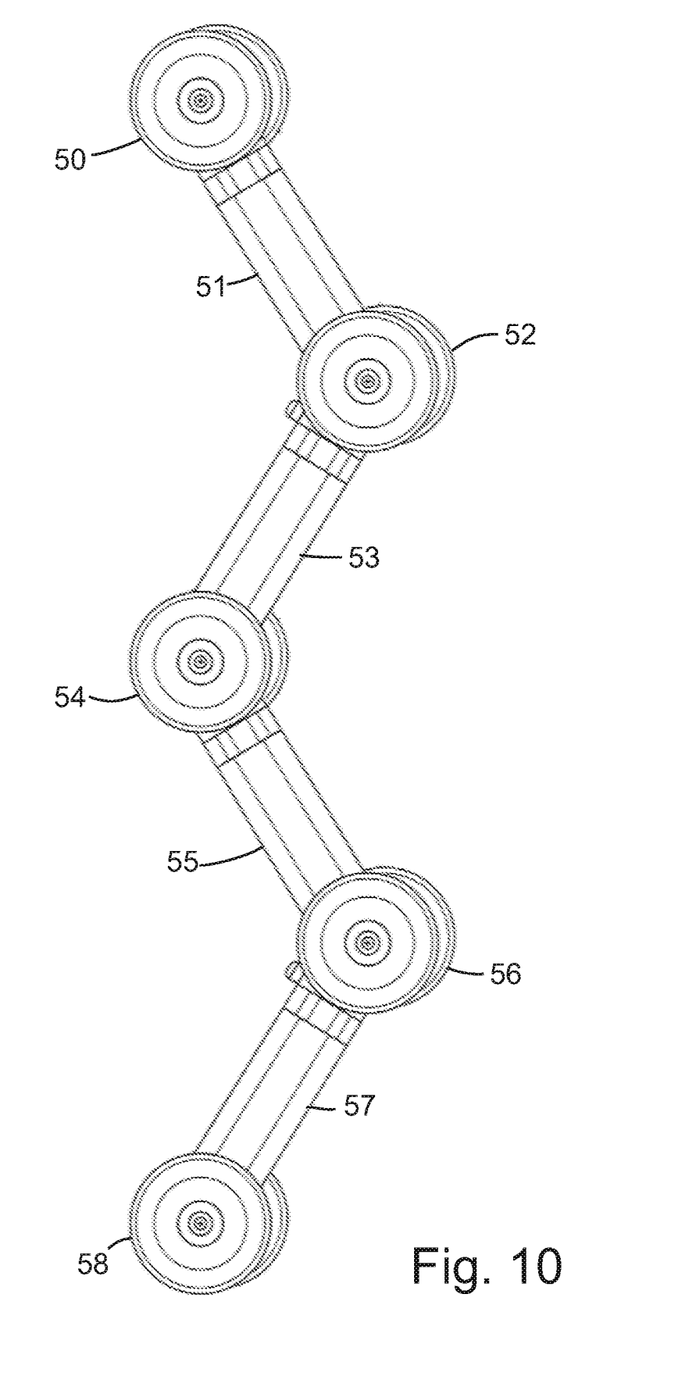
FIG. 10 is a side view of a second embodiment of an articulated smart pig.

A further embodiment of a pipe pig is shown in FIG. 10 with wheel pairs 50, 52, 54, 56 and 58 and connecting links 51, 53, 55 and 57. In an embodiment with paired wheels, there are at least 6 wheels (3 pairs). The connecting links on either side of a pair of wheels both may connect to an axle connecting the wheels in a pair. One or both wheels of a pair of wheels may be a hub driven wheel. Any one or more or all of the pairs of wheels may have one or more hub motors. A tensioner may be provided between each pair of connecting links. Each connecting link may end with a yoke that engages an axle of the wheels. The tensioner may comprise a coil spring that lies between adjacent yokes of respective connecting links and is fastened to each link to resist relative rotation of the connecting links about the axle between the pair of wheels. In another embodiment, the tensioner may comprise a leaf spring anchored to one connecting link at an axle between a pair of wheels and pressing against the other connecting link that connects to the same axle. The tensioner is set so that the pipe pig in the resting state occupies a width greater than the pipe ID for which the pipe pig is intended to be used. In the embodiment of FIG. 10, the wheel diameter is less than half the ID of the pipe that the pig is to be used in. In a preferred embodiment, both wheels in a pair may be individually driven and controlled to cause the pair of wheels to twist, allowing the pig to be oriented within the pipe, for example to negotiate a "T" intersection in the pipe or to go around a 180 degree bend. In a preferred embodiment, all wheels are driven and controlled. More wheels allow more total driving force, useful for example to pull sensor instruments such as an eddy current and/or non-destructive testing (NDT) unit through the pipe.

Figure 11:
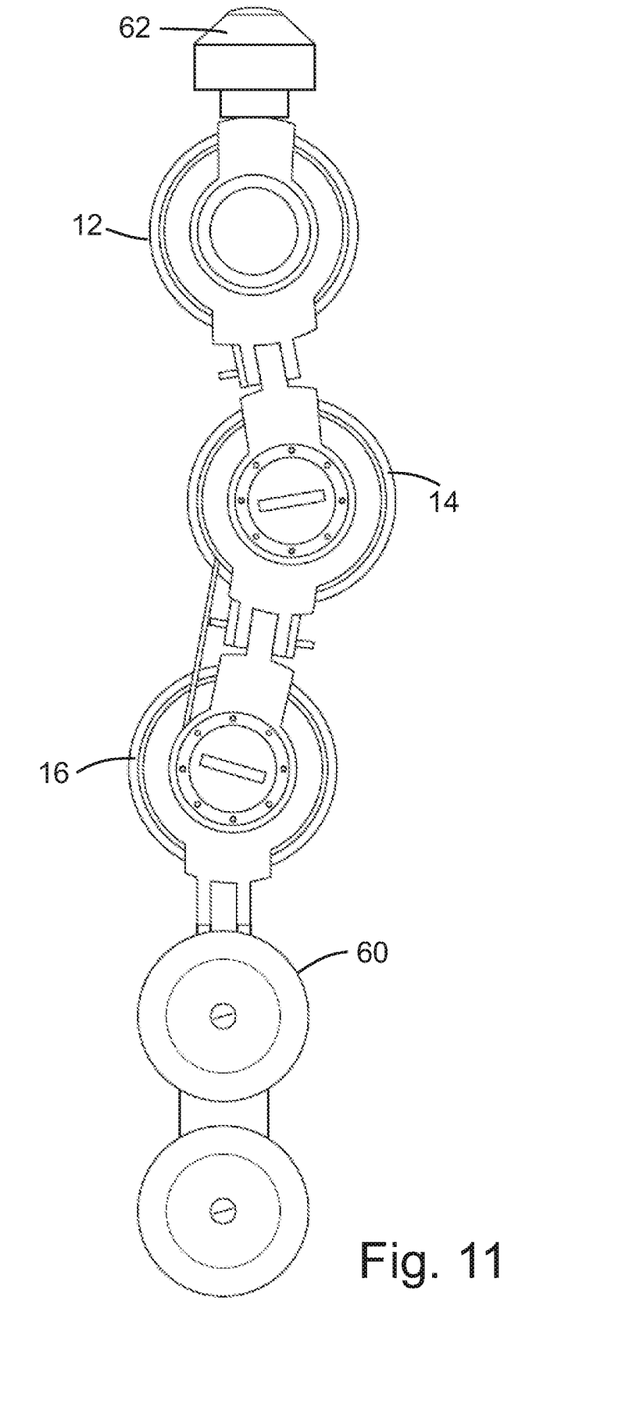
FIG. 11 is a side view of the articulated smart pig of FIG. 4 together with a towed package.

In the embodiment of FIG. 11, a pipe pig 10 has its rearward flanking wheel 16 connected to tow a battery pack 60. In an embodiment the battery pack may be mounted on a pig segment having wheels. In the embodiments of FIGS. 6 and 11, the pipe pig 10 may have a video camera 62 mounted on the flanking wheel 12 with the video camera 62 having a field of view directed away from the intermediate wheel 14. Video cameras for pipe pigs are known. Any suitable video camera may be used. The video camera may deliver video to a memory carried by the pipe pig or to a tether if the pipe pig is run with a tether or sent wirelessly to a remote server or transmitted along the pipe walls. The pipe pig may also carry any conventional sensor used in pipe inspection, for example to detect corrosion or pipe thickness variation. Signals from the sensor may be stored or communicated as with the video data.

Preliminary embodiments have been made using parts (motors, wheels and electronic components) sourced from Japan, but for mass production could be made in several countries.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:
1. An articulated pig for pigging a pipe having an internal dimension, the articulated pig comprising:
   at least an intermediate pig segment, a first flanking pig segment, and a second flanking pig segment, each of the intermediate pig segment, first flanking pig segment, and second flanking pig segment being smaller in cross section than the internal dimension of the pipe;
   the first flanking pig segment being connected to the intermediate pig segment by a first connector, and the second flanking pig segment being connected to the intermediate pig segment by a second connector;
   a biasing element for biasing the first flanking pig segment, second flanking pig segment and intermediate pig segment away from a straight line alignment and against respective portions of an internal surface of the pipe;
   the intermediate pig segment comprising an intermediate wheel, the intermediate wheel configured to contact a first portion of the internal surface of the pipe when in use; and
   a shaft arranged within the intermediate wheel, the intermediate wheel being driven by a motor within the intermediate wheel and connected between the intermediate wheel and the shaft to rotate the intermediate wheel relative to the shaft.

2. The articulated pig of claim 1 in which the first connector and the second connector are arranged to pivot about a first axis defined by the intermediate segment.

3. The articulated pig of claim 2 in which the first connector and the second connector comprise hinged links.

4. The articulated pig of claim 3 in which the hinged links each comprise a respective hinge with a pivotal axis perpendicular to the first axis.

5. The articulated pig of claim 4 in which the shaft is aligned with the first axis.

6. The articulated pig of claim 5 in which the first flanking pig segment and the second flanking pig segment comprise respectively first and second flanking wheels rotatable around respective axes respectively coplanar with the first axis, the wheels configured to contact a second portion of the internal surface of the pipe opposite to the first portion when in use.

7. The articulated pig of claim 6 in which the second flanking wheel is connected to tow a battery pack.

8. The articulated pig of claim 6 further comprising a video camera mounted on the first flanking wheel and the video camera having a field of view directed away from the intermediate wheel.

9. The articulated pig of claim 3 in which the shaft is aligned with the first axis.

10. The articulated pig of claim 9 in which the first flanking pig segment and the second flanking pig segment comprise respectively first and second flanking wheels rotatable around respective axes, the respective axes respectively coplanar with the first axis, the wheels configured to contact a portion of the internal surface of the pipe opposite to the first portion when in use.

11. The articulated pig of claim 10 in which the second flanking wheel is connected to tow a battery pack.

12. The articulated pig of claim 11 further comprising a video camera mounted on the first flanking wheel and the video camera having a field of view directed away from the intermediate wheel.

13. The articulated pig of claim 2 in which the shaft is aligned with the first axis.

14. The articulated pig of claim 13 in which the first flanking pig segment and the second flanking pig segment comprise respectively first and second flanking wheels rotatable around respective axes, the respective axes respectively coplanar with the first axis, the wheels configured to contact a second portion of the internal surface of the pipe opposite to the first portion when in use.

15. The articulated pig of claim 14 in which the second flanking wheel is connected to tow a battery pack.

16. The articulated pig of claim 15 further comprising a video camera mounted on the first flanking wheel and the video camera having a field of view directed away from the intermediate wheel.

17. The articulated pig of claim 13 in which one of the first connector and the second connector is attached to the shaft and the other of the first connector and the second connector is attached to an inner shaft aligned with the first axis and arranged within the shaft.

18. An articulated pig for pigging a pipe having an internal dimension, the articulated pig comprising:
- at least an intermediate pig segment, a first flanking pig segment, and a second flanking pig segment, each of the intermediate pig segment, the first flanking pig segment, and the second flanking pig segment being smaller in cross section than the internal dimension of the pipe;
- the first flanking pig segment being connected to the intermediate pig segment by a first connector, and the second flanking pig segment being connected to the intermediate pig segment by a second connector;
- a biasing element for biasing the first flanking pig segment, the second flanking pig segment and the intermediate pig segment away from a straight line alignment and against respective portions of an internal surface of the pipe;
- in which the intermediate pig segment comprises an intermediate wheel configured to contact a first portion of the internal surface of the pipe when in use, and the first flanking pig segment and the second flanking pig segment comprise respectively first and second flanking wheels configured to contact a portion of the internal surface of the pipe opposite to the first portion when in use; and
- at least one of the intermediate wheel, the first flanking wheel and the second flanking wheel being a drive wheel including a shaft arranged within the drive wheel, and the drive wheel being driven by a motor within the drive wheel and connected between the drive wheel and the shaft to rotate the drive wheel relative to the shaft.

19. The articulated pig of claim 18 in which the drive wheel is the intermediate wheel.

20. The articulated pig of claim 18 further comprising a video camera mounted on the first flanking wheel and the video camera having a field of view directed away from the intermediate wheel.

\* \* \* \* \*